(12) United States Patent
Mori et al.

(10) Patent No.: US 12,130,607 B2
(45) Date of Patent: Oct. 29, 2024

(54) INFORMATION PROCESSING APPARATUS AND METHOD FOR REMOTELY CORRECTING MOVEMENT OF A MACHINE TOOL ON THE BASIS OF MEASUREMENT DATA MEASURED DURING A LICENSING PERIOD

(71) Applicant: DMG MORI CO., LTD., Nara (JP)

(72) Inventors: Masahiko Mori, Nara (JP); Masahiro Shimoike, Nara (JP)

(73) Assignee: DMG MORI CO., LTD., Nara (JP)

( * ) Notice: Subject to any disclaimer, the term of this patent is extended or adjusted under 35 U.S.C. 154(b) by 327 days.

(21) Appl. No.: 17/607,329

(22) PCT Filed: Jun. 26, 2020

(86) PCT No.: PCT/JP2020/025258
§ 371 (c)(1),
(2) Date: Oct. 28, 2021

(87) PCT Pub. No.: WO2020/262620
PCT Pub. Date: Dec. 30, 2020

(65) Prior Publication Data
US 2022/0206456 A1    Jun. 30, 2022

(30) Foreign Application Priority Data

Jun. 28, 2019    (JP) .................................. 2019-121425

(51) Int. Cl.
G05B 19/404    (2006.01)
G05B 19/4065    (2006.01)

(52) U.S. Cl.
CPC ....... *G05B 19/404* (2013.01); *G05B 19/4065* (2013.01); *G05B 2219/49305* (2013.01)

(58) Field of Classification Search
CPC .................................................. G09B 19/4065
See application file for complete search history.

(56) References Cited

U.S. PATENT DOCUMENTS 5,751,585 A * 5/1998 Cutler .................. H05K 3/0038
318/590
6,952,680 B1 * 10/2005 Melby .................. G06Q 20/203
705/28

(Continued)

FOREIGN PATENT DOCUMENTS

CN    106056263 A    10/2016
CN    108364122 A    8/2018

(Continued)

OTHER PUBLICATIONS

International Search Report and Written Opinion dated Jul. 21, 2020 for Application No. PCT/JP2020/025258.

(Continued)

*Primary Examiner* — Nicholas Klicos
(74) *Attorney, Agent, or Firm* — DiPerna Law Firm, P.C.

(57) ABSTRACT

This invention provides an information processing apparatus that performs maintenance of a machine tool based on received measurement data. The information processing apparatus includes an acquirer that acquires maintenance information including measurement data by a measuring instrument attached to a machine tool and identification information of the machine tool, a calculator that calculates an operation accuracy of the machine tool using the acquired maintenance information, and a correction information generator that generates correction information of the machine tool based on a calculation result by the calculator.

11 Claims, 10 Drawing Sheets

| MAINTENANCE INFORMATION | | MEASURING INSTRUMENT INFORMATION | | | OPERATION INFORMATION | | | OPERATION ACCURACY | CORRECTION INFORMATION |
|---|---|---|---|---|---|---|---|---|---|
| MACHINE TOOL ID | MEASUREMENT DATA | MEASURING INSTRUMENT ID | LICENSING PERIOD | . . . | INTERNAL TEMPERATURE | OPERATION HISTORY | . . . | | |
| | | | | | | | | | |
| | | | | | | | | | |
| | | | | | | | | | |
| | | | | | | | | | |
| : | : | : | : | : | : | : | : | : | : |

(56) References Cited

U.S. PATENT DOCUMENTS

| | | | |
|---|---|---|---|
| 2003/0120509 A1* | 6/2003 | Bruch | G07F 17/0042 |
| | | | 705/5 |
| 2007/0260410 A1* | 11/2007 | Raymond | G05B 23/0264 |
| | | | 702/81 |
| 2008/0109178 A1* | 5/2008 | Sogard | G03F 7/70775 |
| | | | 702/66 |
| 2011/0178619 A1 | 7/2011 | Jung et al. | |
| 2012/0303674 A1 | 11/2012 | Boensch et al. | |
| 2012/0323517 A1* | 12/2012 | Pado | G01N 29/245 |
| | | | 702/104 |
| 2013/0158713 A1* | 6/2013 | Geissler | G05D 23/19 |
| | | | 700/275 |
| 2017/0092021 A1* | 3/2017 | Nielsen | G05B 23/0283 |
| 2017/0131710 A1 | 5/2017 | Chen et al. | |
| 2018/0052439 A1* | 2/2018 | Chen | G05B 19/4065 |
| 2018/0223243 A1* | 8/2018 | Emmerson | C12M 41/32 |
| 2018/0334917 A1* | 11/2018 | Nanda | F16C 19/525 |
| 2018/0341235 A1* | 11/2018 | Oda | G05B 15/02 |
| 2019/0339688 A1* | 11/2019 | Cella | H04L 1/18 |
| 2019/0340269 A1* | 11/2019 | Biernat | H04L 63/12 |

FOREIGN PATENT DOCUMENTS

| | | |
|---|---|---|
| DE | 102008045315 A1 | 3/2010 |
| DE | 102011108361 A1 | 5/2012 |
| JP | H11194809 A | 7/1999 |
| JP | H11277367 A | 10/1999 |
| JP | H11277368 A | 10/1999 |
| JP | 2002328714 A | 11/2002 |
| JP | 2003346058 A | 12/2003 |
| JP | 2009140474 A | 6/2009 |

OTHER PUBLICATIONS

An Office Action issued on Sep. 12, 2023 of Chinese Patent Application No. 202080046580.1.

Extended European Search Report dated Sep. 27, 2022 for European Application No. 20831593.7, 9 pages.

* cited by examiner

| MAINTENANCE INFORMATION | | MEASURING INSTRUMENT INFORMATION | | | OPERATION INFORMATION | | | OPERATION ACCURACY | CORRECTION INFORMATION |
|---|---|---|---|---|---|---|---|---|---|
| MACHINE TOOL ID | MEASUREMENT DATA | MEASURING INSTRUMENT ID | LICENSING PERIOD | ... | INTERNAL TEMPERATURE | OPERATION HISTORY | ... | | |
| | | | | | | | | | |
| | | | | | | | | | |
| | | | | | | | | | |
| | | | | | | | | | |
| ⋮ | ⋮ | ⋮ | ⋮ | ⋮ | ⋮ | ⋮ | ⋮ | ⋮ | ⋮ |

| Maintenance Information | | Measuring Instrument | Measuring Instrument Information | | | Operation Information | | | Operation Accuracy | Correction Information |
|---|---|---|---|---|---|---|---|---|---|---|
| Machine Tool ID | Measurement Data | | Measuring Instrument ID | Licensing Period | ... | Internal Temperature | Operation History | ... | | |
|  |  |  |  |  |  |  |  |  |  |  |
|  |  |  |  |  |  |  |  |  |  |  |
|  |  |  |  |  |  |  |  |  |  |  |
|  |  |  |  |  |  |  |  |  |  |  |
| ⋮ | ⋮ | ⋮ | ⋮ | ⋮ | ⋮ | ⋮ | ⋮ | ⋮ | ⋮ | ⋮ |

INFORMATION PROCESSING APPARATUS AND METHOD FOR REMOTELY CORRECTING MOVEMENT OF A MACHINE TOOL ON THE BASIS OF MEASUREMENT DATA MEASURED DURING A LICENSING PERIOD

RELATED APPLICATION

This application is an application under 35 U.S.C. 371 of International Application No. PCT/JP2020/025258 filed on Jun. 26, 2020 which is based upon and claims the benefit of priority from Japanese patent application No. 2019-121425, filed on Jun. 28, 2019, the disclosures of each of which are incorporated herein in their entirety by reference.

TECHNICAL FIELD

The present invention relates to an information processing apparatus, an information processing method, and an information processing program.

BACKGROUND ART

In the above technical field, patent literature 1 discloses a technique of distributing a monitoring devise to a specific person and analyzing information acquired by the device.

CITATION LIST

Patent Literature

Patent literature 1: Japanese Patent Laid-Open No. 2009-140474

SUMMARY OF THE INVENTION

Technical Problem

However, the technique described in the above literature cannot perform maintenance of a machine tool from a place far apart from the machine tool based on measurement data.

The present invention enables to provide a technique of solving the above-described problem.

Solution to Problem

One example aspect of the invention provides an information processing apparatus comprising:

an acquirer that acquires maintenance information including measurement data by a measuring instrument attached to a machine tool and identification information of the machine tool;

a calculator that calculates an operation accuracy of the machine tool using the acquired maintenance information; and a correction information generator that generates correction information of the machine tool based on a calculation result by the calculator.

Another example aspect of the invention provides an information processing method comprising:

acquiring maintenance information including measurement data by a measuring instrument attached to a machine tool and identification information of the machine tool;

calculating an operation accuracy of the machine tool using the acquired maintenance information; and generating correction information of the machine tool based on a calculation result in the calculating.

Still other example aspect of the invention provides an information processing program for causing a computer to execute a method, comprising:

acquiring maintenance information including measurement data by a measuring instrument attached to a machine tool and identification information of the machine tool;

calculating an operation accuracy of the machine tool using the acquired maintenance information; and generating correction information of the machine tool based on a calculation result in the calculating.

Advantageous Effects of Invention

According to the present invention, it is possible to perform maintenance of a machine tool from a place far apart from the machine tool.

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

An information processing apparatus 100 according to the first example embodiment of the present invention will be described with reference to FIG. 1. The information processing apparatus 100 is an apparatus that generates correction information of a machine tool from measurement data by a measuring instrument.

Figure 1:
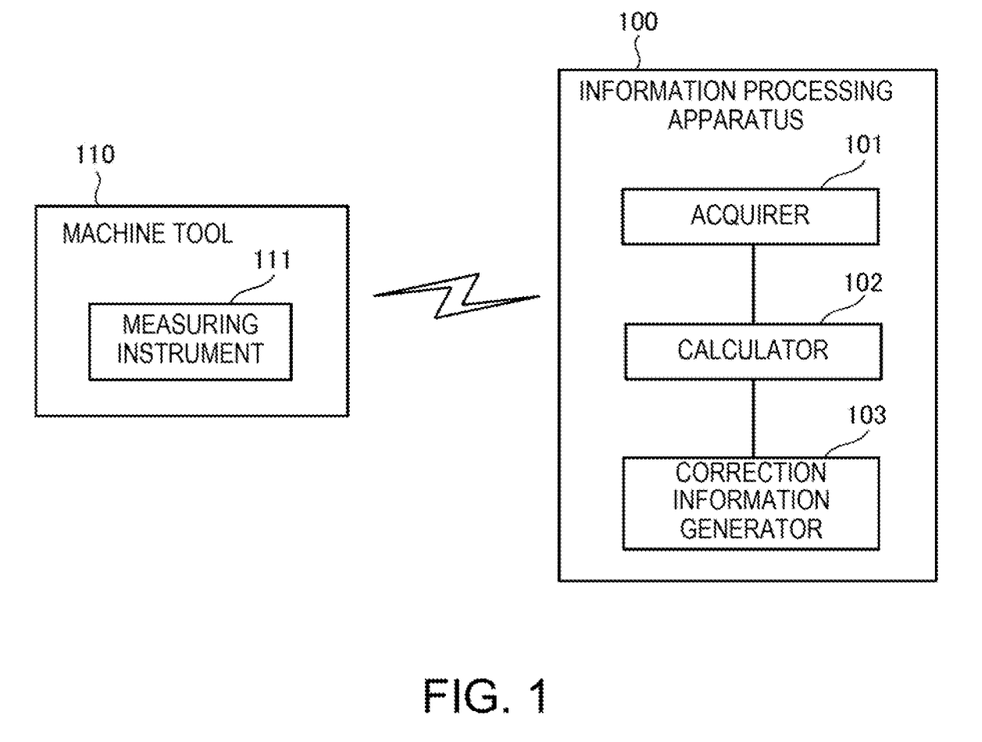
FIG. 1 is a block diagram showing the configuration of an information processing apparatus according to the first example embodiment of the present invention.

As shown in FIG. 1, the information processing apparatus 100 includes an acquirer 101, a calculator 102, and a correction information generator 103. The acquirer 101 acquires maintenance information including measurement data by a measuring instrument 111 attached to a machine tool 110 and identification information of the machine tool 110. The calculator 102 calculates the operation accuracy of the machine tool 110 using the acquired maintenance information. The correction information generator 103 generates correction information of the machine tool 110 based on the calculation result of the calculator 102.

For example, a case in which a reference object (a block or a table may be used) is fixed in a machine, and a displacement sensor is attached to the spindle will be examined. The displacement sensor is moved based on a machine command value (three-dimensional position coordinates) and made to approach the reference object. The machine command value (three-dimensional position coordinates) obtained when the detection value (a pressure value or a current value) of the displacement sensor has exceeded a threshold due to the approach of the displacement sensor to the reference object is obtained as measurement data (data representing the position of the edge of the reference object).

If the measurement data changes even though the reference object does not change, the operation accuracy (accuracy indicating whether the spindle is moving according to the command value) of the machine tool changes. If the accuracy of the relative movement between the spindle and the table degrades because of damage to the machine tool or the like, a change occurs in the measurement data. Note that the displacement sensor may be attached in the machine, and the reference object may be attached to the spindle. A plurality of reference objects may be fixed. Alternatively, a shape sensor or a vibration sensor may be used in place of the displacement sensor. The measurement data may be acquired based on an image captured by a camera attached to the spindle.

According to this example embodiment, it is possible to perform maintenance of the machine tool from a place far apart from the machine tool.

Second Example Embodiment

Figure 2:
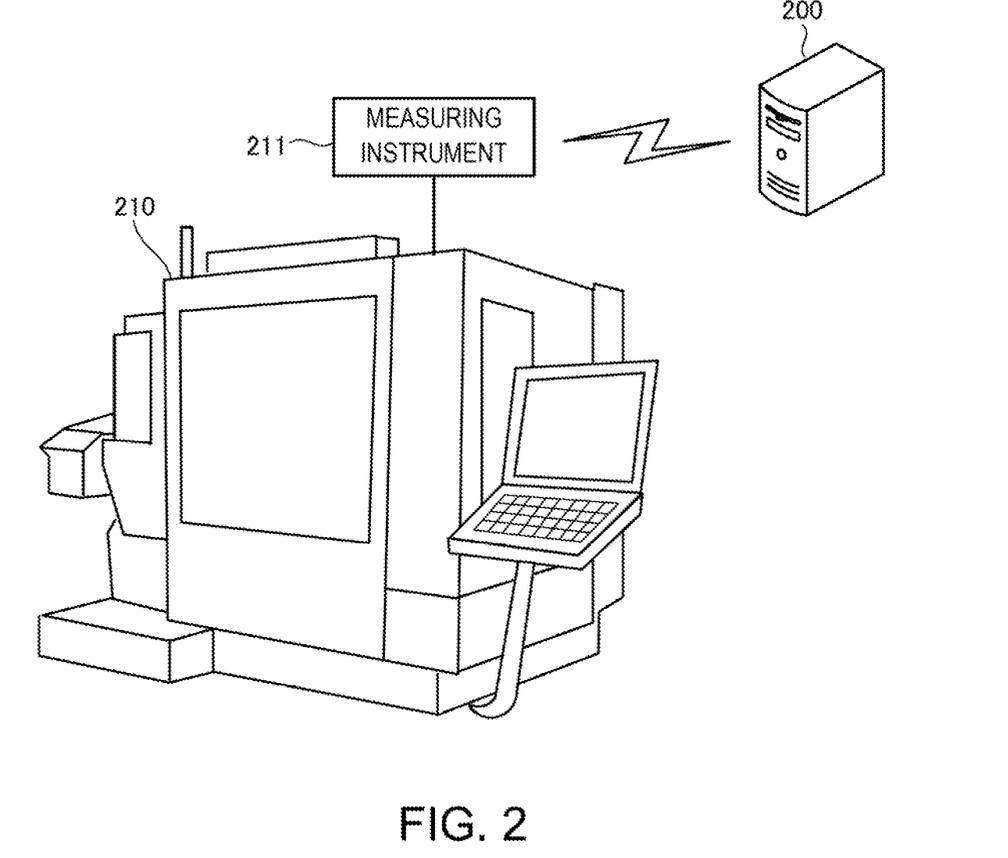
FIG. 2 is a view for explaining the outline of processing by an information processing apparatus according to the second example embodiment of the present invention.

An information processing apparatus according to the second example embodiment of the present invention will be described next with reference to FIGS. 2 to 6. FIG. 2 is a view for explaining the outline of processing by an information processing apparatus 200 according to this example embodiment.

To operate a machine tool 210 without a delay, various parameters and operation conditions necessary for operating the machine tool 210 need to be adjusted. However, it is difficult for the user of the machine tool 210 to adjust the machine tool 210. In this case, the user needs to request a serviceman who is well-versed in the machine tool 210 to conduct maintenance and take a visit from the serviceman. However, the timing of request for the visit of the serviceman by the user is not always correct. Even if maintenance is unnecessary, the serviceman who has accepted the visit request needs to visit the user, and this may be wasteful. In some cases, instead of directly visiting the user and doing maintenance of the machine tool 210, the serviceman may cope with the request by rewriting the firmware of the machine tool 210.

The information processing apparatus 200 generates correction information based on maintenance information and operation information of the machine tool 210, and transmits it to the machine tool 210. That is, the information processing apparatus 200 receives, from a measuring instrument 211 attached to the machine tool 210, maintenance information including measurement data by the measuring instrument 211. Also, the information processing apparatus 200 acquires the operation information of the machine tool. The information processing apparatus 200 generates correction information of the machine tool 210 based on the received maintenance information and the operation information. The operation information is information including time from power-on to power-off of the machine tool 210, the number of revolutions of the spindle, the number of formed works, the internal temperature of the machine tool 210, the operation history of the machine tool 210, and the like, but is not limited to these. The correction information is information for correcting, revising, or rewriting parameters necessary for the operation of the machine tool 210.

Also, the information processing apparatus 200 determines whether the measurement data is data measured during the licensing period of the measuring instrument 211. The licensing period is, for example, the lease period or the rental period of the measuring instrument 211, but is not limited to this. For example, if the machine tool 210 is a leased machine tool, the information processing apparatus 200 may determine whether the measurement data is data measured during the lease period of the machine tool 210. For example, if the user purchases the measuring instrument 211, the licensing period may be semipermanent. The licensing period may be updatable.

Upon determining that the measured data is not data measured during the licensing period, the information processing apparatus 200 does not generate correction information. That is, if the measured data is data measured during the licensing period, the information processing apparatus 200 generates correction information. The generated correction information may be transmitted to the machine tool 210 via, for example, the measuring instrument 211, or may be directly transmitted from the information processing apparatus 200 to the machine tool 210. The machine tool 210 can corrector rewrite the parameters necessary for the operation of the machine tool 210 based on the received correction information.

Figure 3:
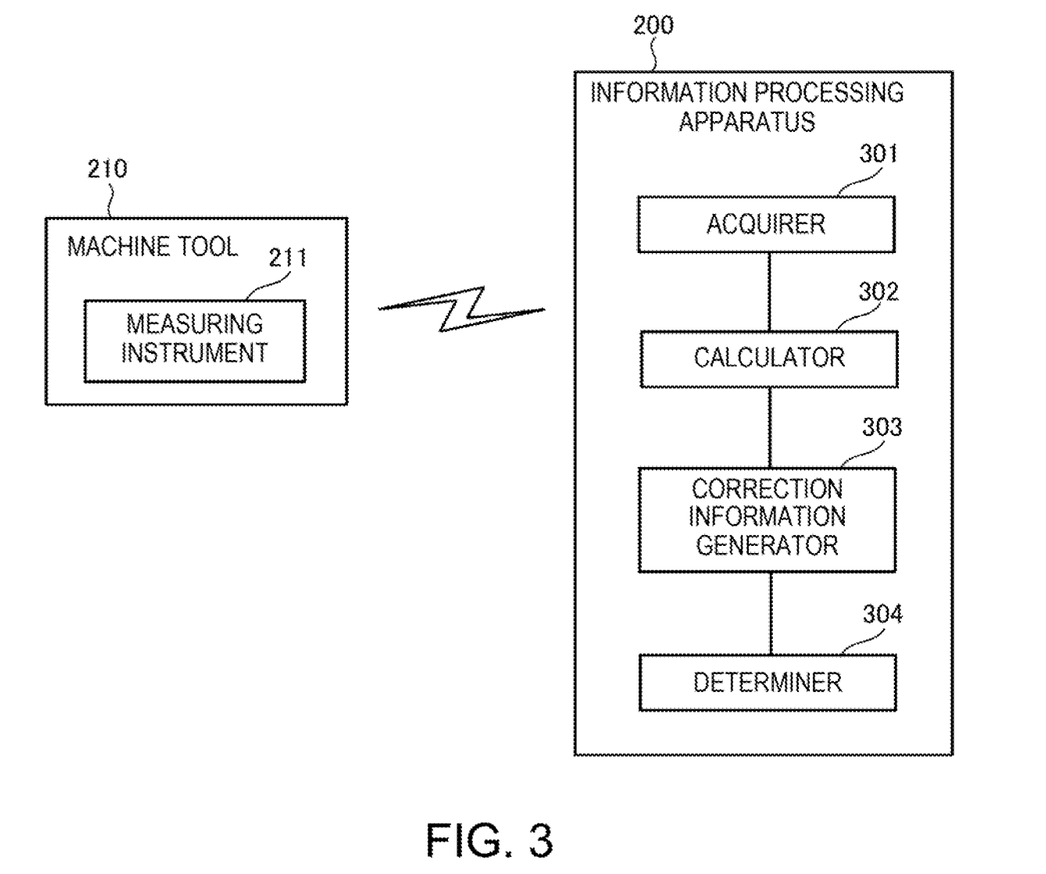
FIG. 3 is a block diagram for explaining the configuration of the information processing apparatus according to the second example embodiment of the present invention.

FIG. 3 is a block diagram for explaining the configuration of the information processing apparatus 200 according to this example embodiment. The information processing apparatus 200 includes an acquirer 301, a calculator 302, a correction information generator 303, and a determiner 304.

The acquirer 301 acquires maintenance information including measurement data measured by the measuring instrument 211 attached to the machine tool 210 and the identification information of the machine tool 210. The acquired maintenance information is stored in a predetermined storage unit. Note that the predetermined storage unit may be a storage unit provided in the information processing apparatus 200, or may be a storage unit outside the information processing apparatus 200.

The identification information of the machine tool 210 may be stored in the measuring instrument 211 when attaching the measuring instrument 211 to the machine tool 210, or the measuring instrument 211 may acquire the identification information from the machine tool 210. That is, the measurement data measured by the measuring instrument 211 is linked with the identification information of the machine tool 210 and transmitted as the maintenance information to the acquirer 301. Note that linkage of the measurement data and the identification information may be done by the measuring instrument 211 or the information processing apparatus 200 (acquirer 301).

Furthermore, the acquirer 301 acquires the operation information of the machine tool 210. The acquired operation information is linked with the identification information of the machine tool 210 and stored in the storage unit, like the maintenance information. The operation information including information such as time from power-on to power-off of the machine tool 210, the total number of revolutions of the spindle, the number of revolutions of the spindle, the number of formed works, the internal temperature of the machine tool 210, and the operation history of the machine tool 210. Note that the measuring instrument 211 may link the maintenance information and the operation information with each other and transmit these to the information processing apparatus 200.

The calculator 302 calculates the operation accuracy of the machine tool 210 using the maintenance information acquired by the acquirer 301. The operation accuracy is, for example, the three-dimensional positioning accuracy of the machine tool. That is, the error between position information included in a moving instruction to a moving mechanism and position information of a target that has actually moved is used. That is, for example, operation accuracy=measurement position−moving instruction position. If the above-described measurement data indicates the three-dimensional position coordinates of one point in the machine, the displacement amount of a whole space is calculated as the operation accuracy. Alternatively, if the three-dimensional position coordinates of a plurality of points in the machine can be acquired simultaneously, the relative distortions between a plurality of points in the machine can be detected as the operation accuracy.

The calculator 302 calculates the operation accuracy of the machine tool 210 by, for example, comparing reference measurement data serving as a reference and stored in the predetermined storage unit with the measurement data extracted from the maintenance information. As for the reference measurement data, for example, data measured at the time of shipment of the machine tool 210 may be stored as the reference measurement data in the predetermined storage unit, or data obtained when delivering the machine tool 210 to the user may be stored as the reference measurement data in the predetermined storage unit. Note that the calculation of the operation accuracy by the calculator 302 is not limited to calculation by comparison with the reference measurement data. For example, the operation accuracy may be calculated by accumulating measurement data from the operation initial time of the machine tool 210 and comparing the average value of the accumulated accumulation measurement data with the measurement data.

The correction information generator 303 generates correction information of the machine tool 210 based on the calculation result of the operation accuracy calculated by the calculator 302. If lowering of the operation accuracy is observed as the calculation result, the correction information generator 303 generates correction information that returns the lowering of the operation accuracy to the original state and obtain an operation accuracy in a recommended range. More specifically, the correction information generator 303 generates correction information for adjusting the setting parameters and the like of the machine tool 210 such that an operation accuracy in a recommended range can be obtained.

Also, the correction information generator 303 generates correction information based on the operation information of the machine tool 210. For example, if the internal temperature of the machine tool 210 is acquired as the operation information, the correction information generator 303 does not use, for generation of correction information, the operation accuracy calculated using measurement data measured in a state in which the internal temperature exceeds a predetermined temperature. The measurement data measured in a state in which the internal temperature of the machine tool 210 exceeds a predetermined temperature may include abnormal data. For this reason, even if correction data is generated using such measurement data, it is impossible to perform correction to a state in which the machine tool 210 exhibits the operation accuracy in the recommended range. Hence, measurement data that may include such abnormal data is excluded from generation of correction information.

Additionally, for example, if the operation history of the machine tool 210 is acquired as the operation information, the correction information generator 303 does not use, for generation of correction information, the operation accuracy calculated using measurement data measured in a state in which a predetermined time has not elapsed yet from the operation of the machine tool 210. The measurement data measured in a state in which a predetermined time has not elapsed yet from the operation of the machine tool 210 is data during the running—in operation period of the machine tool 210, and the measurement data is not stable and readily varies. Hence, measurement data that may include such unstable measurement data is excluded from generation of correction information.

The determiner 304 analyzes the maintenance information acquired by the acquirer 301 and determines whether it is measurement data measured during the licensing period of the measuring instrument 211. If the determiner 304 determines that the measurement data is not data measured during the licensing period of the measuring instrument 211, the correction information generator 303 does not generate correction information. That is, if the measuring instrument 211 is a leased product, and the measurement data is measurement data measured by the measuring instrument 211 during the lease period (licensing period) of the measuring instrument 211, the correction information generator 303 generates correction information. Accordingly, if the user unauthorizedly uses the measuring instrument 211, no correction information is generated, and authorized use of the measuring instrument 211 or the machine tool 210 by the user can be promoted.

Figure 4:
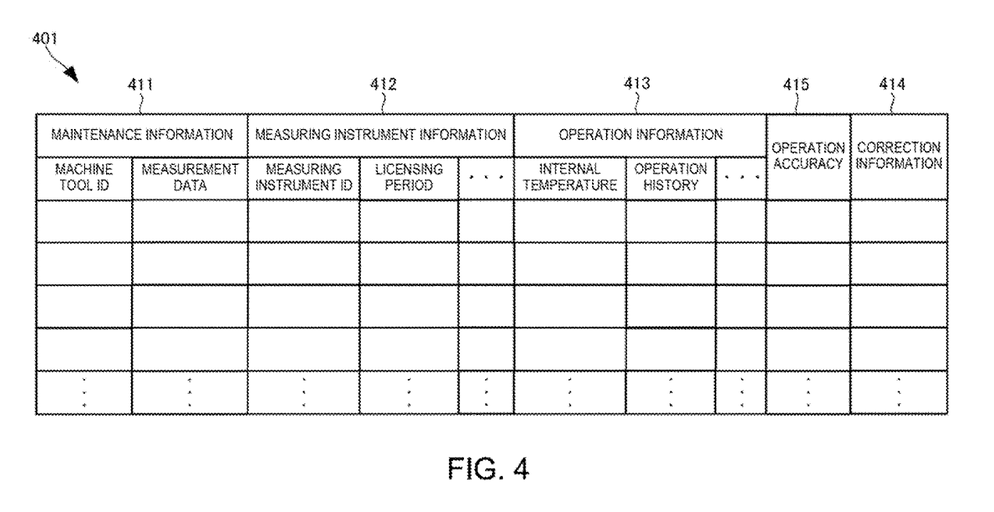
FIG. 4 is a view for explaining an example of a correction information table provided in the information processing apparatus according to the second example embodiment of the present invention.

FIG. 4 is a view for explaining an example of a correction information table provided in the information processing apparatus 200 according to this example embodiment. A correction information table 401 stores measuring instrument information 412, operation information 413, and correction information 414 in association with maintenance information 411. The maintenance information 411 is data that links a machine tool ID (identifier) that is an identifier used to identify the machine tool 210 with measurement data measured by the measuring instrument 211. The measuring instrument information 412 is data including a measuring instrument ID that is an identifier used to identify the measuring instrument 211 and the licensing period of the measuring instrument 211. The operation information 413 is data representing the operation state of the machine tool 210, and preferably includes at least one of the internal temperature and the operation history of the machine tool 210. Also, the operation information 413 is not limited to these, and may include another information such as the external temperature or the maintenance history of the machine tool 210. The correction information 414 is data for correcting parameters and the like necessary for the operation of the machine tool 210, and is data generated based on the maintenance information 411. This is data indicating the operation accuracy of the machine tool 210 calculated based on the maintenance information 411. The information processing apparatus 200 generates correction information based on the operation accuracy by referring to the correction information table 401.

More specifically, correction is performed by adding, to the command value, a value that cancels the lowering (error amount) of the calculated operation accuracy. If measurement data at only one reference point is acquired, all positions of the space in the machine have the same correction amount. On the other hand, if measurement data at a plurality of reference points are simultaneously acquired, correction amounts according to the distortion of the space are set. For example, assume that reference points (command values) exist at three coordinate points 0, 100 and 200, and measurement data of 0, 100.1, and 199.9 are obtained by measurement of the reference points. Extension occurs in a range from 0 to 100, and reduction occurs in a range from 100 to 200. When the relative changes between the reference points are detected, the command value in the range from 0 to 100 is multiplied by a correction value of 0.99 for reduction, and the command value in the range from 100 to 200 is multiplied by a correction value of 1.01 for extension.

Figure 5:
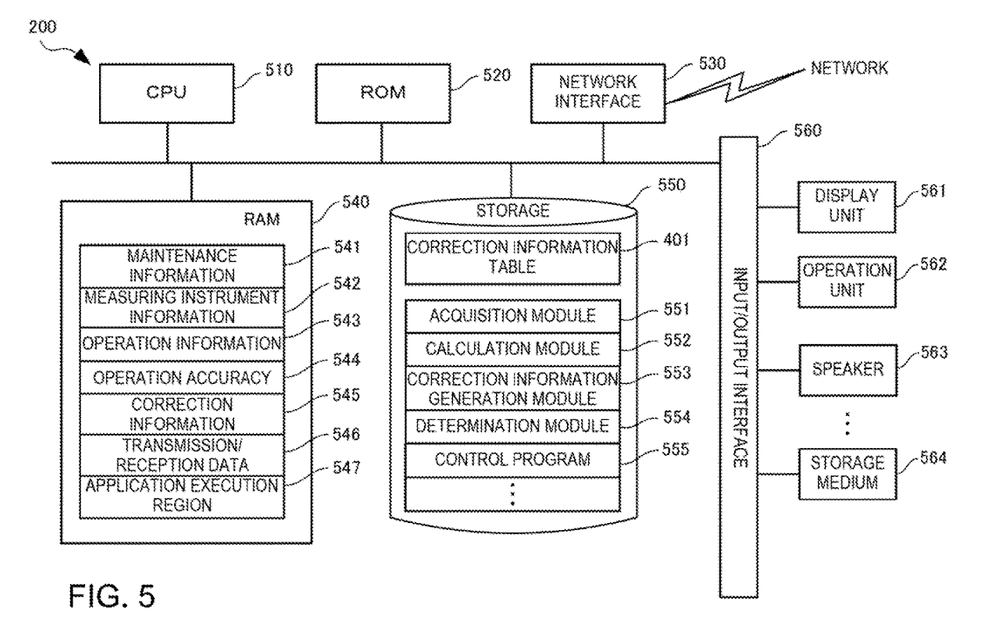
FIG. 5 is a block diagram for explaining the hardware configuration of the information processing apparatus according to the second example embodiment of the present invention.

FIG. 5 is a block diagram for explaining the hardware configuration of the information processing apparatus 200 according to this example embodiment. A CPU (Central Processing Unit) 510 is a processor for arithmetic control, and implements the functional components of the information processing apparatus 200 shown in FIG. 3 by executing a program. The CPU 510 may include a plurality of processors and execute different programs, modules, tasks, threads, or the like in parallel. A ROM (Read Only Memory) 520 stores permanent data such as initial data and programs, and other programs. A network interface 530 communicates with another apparatus or the like via a network. Note that the CPU 510 is not limited to one CPU, and may include a plurality of CPUs or a GPU (Graphics Processing Unit) for image processing. The network interface 530 preferably includes a CPU independent of the CPU 510 and writes or reads transmission/reception data in or from an area of a RAM (Random Access Memory) 540. In addition, a DMAC (Direct Memory Access Controller) (not shown) that transfers data between the RAM 540 and a storage 550 is preferably provided. Furthermore, the CPU 510 recognizes that data is received by or transferred to the RAM 540 and processes the data. Also, the CPU 510 prepares a processing result in the RAM 540, and causes the network interface 530 or the DMAC to do transmission or transfer later.

The RAM 540 is a random access memory used by the CPU 510 as a work area for temporary storage. In the RAM 540, an area for storing data necessary for implementing this example embodiment is allocated. Maintenance information 541 is information including measurement data that the acquirer 301 acquires from the measuring instrument 211, and the identification information of the machine tool 210. The maintenance information 541 may also include environment information such as a temperature and a humidity at the time of measurement, immediately preceding operation data (how many revolutions the spindle has made, and how fast and how the table has moved), and a power consumption amount.

Measuring instrument information 542 is information including an identifier used to identify the measuring instrument 211 and the licensing period of the measuring instrument 211. Operation information 543 is information concerning the operation of the machine tool 210. An operation accuracy 544 is information indicating the accuracy of the operation of the machine tool 210, which is calculated using the acquired maintenance information. Correction information 545 is information used to correct parameters necessary for the operation of the machine tool 210 based on the calculation result of the calculator 302.

Transmission/reception data 546 is data transmitted/received via the network interface 530. The RAM 540 also includes an application execution region 547 used to execute various kinds of application modules.

The storage 550 stores databases and various kinds of parameters, or the following data and programs necessary for implementing this example embodiment. The storage 550 stores the correction information table 401. The correction information table 401 is the table shown in FIG. 4, which stores the maintenance information 411 in association with the correction information 414 and the like.

The storage 550 also stores an acquisition module 551, a calculation module 552, a correction information generation module 553, and a determination module 554. The acquisition module 551 is a module configured to acquire maintenance information including measurement data by the measuring instrument 211 attached to the machine tool 210 and the identification information of the machine tool 210. The calculation module 552 is a module configured to calculate the operation accuracy of the machine tool 210 using the acquired maintenance information. The correction information generation module 553 is a module configured to generate the correction information of the machine tool 210 based on the calculation result of the calculator 302. Also, the correction information generation module 553 is a module configured not to generate correction information if the determiner 304 determines that the measurement data is not data measured during the licensing period. The determination module 554 is a module configured to analyze the maintenance information and determine whether the measurement data is data measured during the licensing period of the measuring instrument 211. The modules 551 to 554 are loaded into the application execution region 547 of the RAM 540 and executed by the CPU 510. A control program 555 is a program configured to control the entire information processing apparatus 200.

An input/output interface 560 interfaces input/output data to/from an input/output device. A display unit 561 and an operation unit 562 are connected to the input/output interface 560. A storage medium 564 may further be connected to the input/output interface 560. Also, a speaker 563 that is an audio output unit, a microphone (not shown) that is an audio input unit, or a GPS position determiner may be connected. Note that in the RAM 540 and the storage 550 shown in FIG. 5, programs and data concerning general-purpose functions of the information processing apparatus 200 and other implementable functions are not shown.

Figure 6:
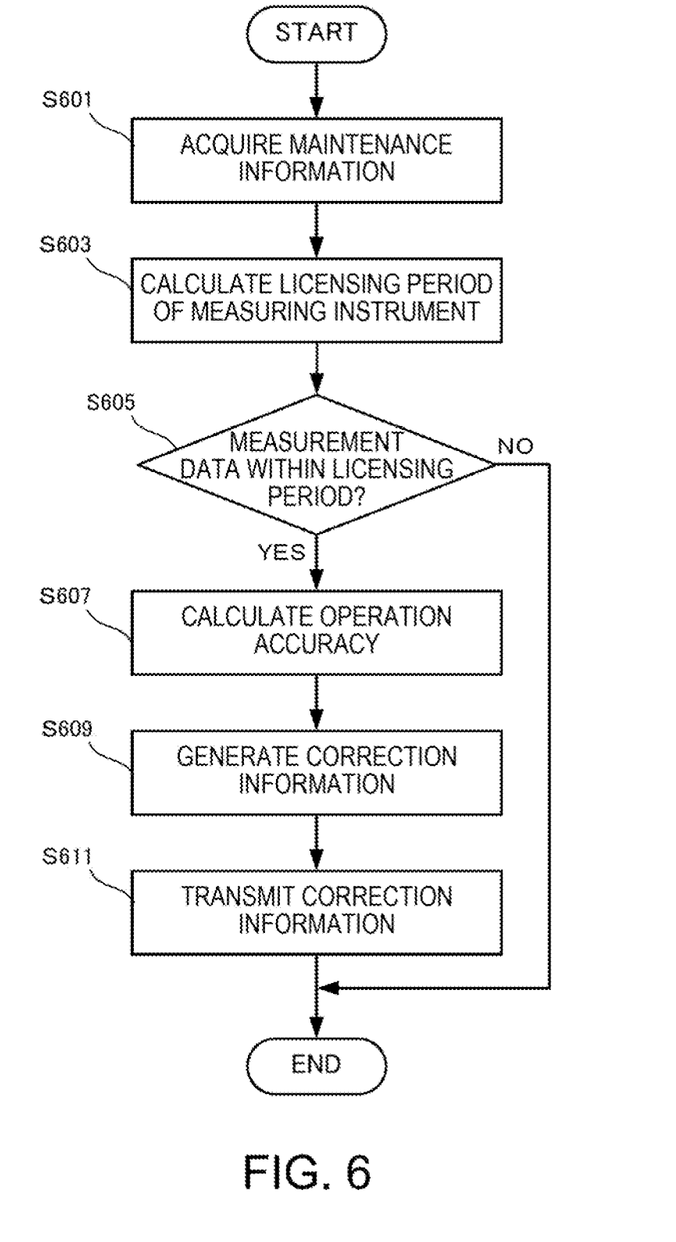
FIG. 6 is a flowchart for explaining the processing procedure of the information processing apparatus according to the second example embodiment of the present invention.

FIG. 6 is a flowchart for explaining the processing procedure of the information processing apparatus 200 according to this example embodiment. This flowchart is executed by the CPU 510 shown in FIG. 5 using the RAM 540, and the functional components of the information processing apparatus 200 shown in FIG. 3 are implemented. In step S601, the information processing apparatus 200 acquires maintenance information including measurement data measured by the measuring instrument 211 attached to the machine tool 210 and the identification information of the machine tool 210.

In step S603, the information processing apparatus 200 analyzes the acquired maintenance information and calculates the licensing period of the measuring instrument 211. In step S605, the information processing apparatus 200 determines whether measurement data extracted from the acquired maintenance information is measurement data measured by the measuring instrument 211 during the licensing period. Upon determining that it is not measurement data measured during the licensing period (NO in step S605), the information processing apparatus 200 ends the processing.

Upon determining that it is measurement data measured during the licensing period (YES in step S605), the information processing apparatus 200 advances to step S607. In step S607, the information processing apparatus 200 calculates the operation accuracy of the machine tool 210 using the acquired maintenance information. In step S609, the information processing apparatus 200 generates correction information of the machine tool 210 based on the calculation result of the operation accuracy. In step S611, the information processing apparatus 200 transmits the generated correction information to the machine tool 210 via the measuring instrument 211.

According to this example embodiment, since the correction information of the machine tool is generated if it is the licensing period of the measuring instrument, the user can be prevented from unauthorizedly using the measuring instrument and encouraged to pay the lease fee or the like. Since daily maintenance can be done via the correction information, the number of times of visit of the serviceman of the machine tool to the user can be decreased.

Third Example Embodiment

Figure 7:
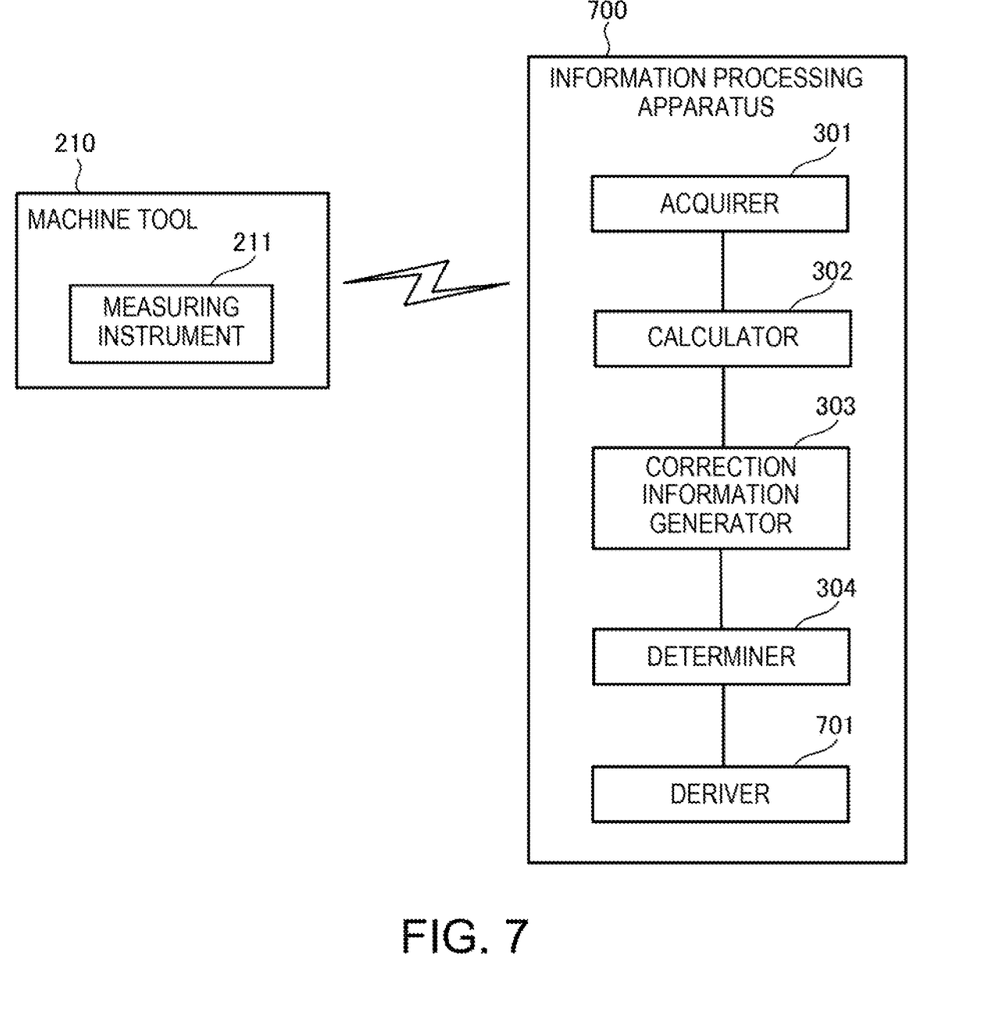
FIG. 7 is a block diagram for explaining the configuration of an information processing apparatus according to the third example embodiment of the present invention.

An information processing apparatus according to the third example embodiment of the present invention will be described next with reference to FIGS. 7 to 10. FIG. 7 is a view for explaining the configuration of an information processing apparatus 700 according to this example embodiment. The information processing apparatus 700 according to this example embodiment is different from the second example embodiment in that the information processing apparatus 700 includes a deriver. The rest of the components and operations is the same as in the second example embodiment. Hence, the same reference numerals denote the same components and operations, and a detailed description thereof will be omitted.

The information processing apparatus 7K) includes a deriver 701. The deriver 701 analyzes maintenance information acquired by an acquirer 301, and derives the calibration period of a machine tool 210. If it is not the calibration period of the machine tool 210, a correction information generator 303 does not generate correction information. If it is the calibration period, it is possible to correct and rewrite the parameters or the like of the machine tool 210 during the calibration operation of the machine tool 210. Since the difference between the information acquisition date/time and the correction data generation date/time can be limited within the calibration period, application of correction parameters using past information can be prevented. The deriver 701, for example, refers to a calibration period table prepared in advance using the identification information of the machine tool, which is included in the maintenance information, and derives a calibration period (for example, three weeks) corresponding to the machine tool.

Figure 8:
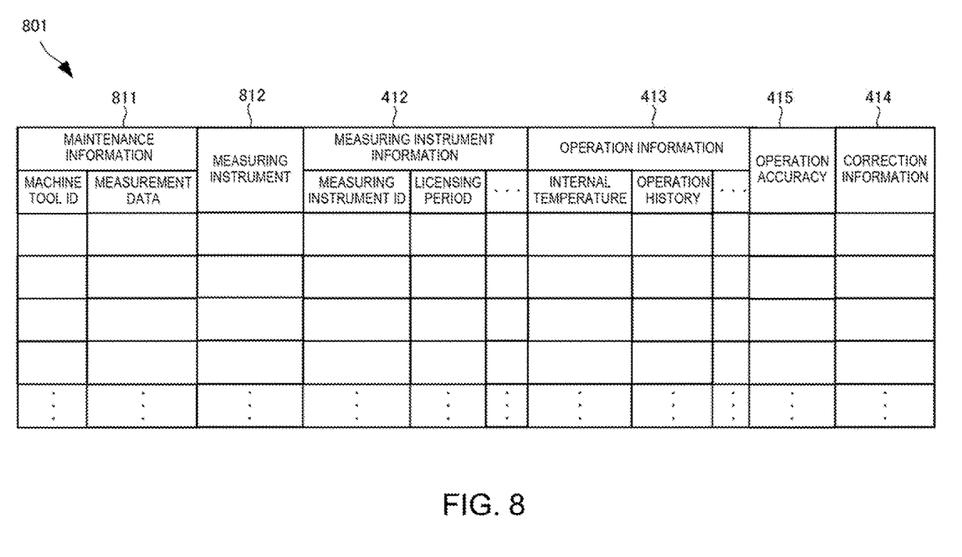
FIG. 8 is a view for explaining an example of a correction information table provided in the information processing apparatus according to the third example embodiment of the present invention.

FIG. 8 is a view for explaining an example of a correction information table provided in the information processing apparatus according to this example embodiment. A correction information table 801 stores measuring instrument information 412, operation information 413, correction information 414, and an operation accuracy 415 in association with maintenance information 811. The information processing apparatus 700 refers to the correction information table 801, derives the calibration period of the machine tool 210 from the operation accuracy 415, and generates correction information.

Figure 9:
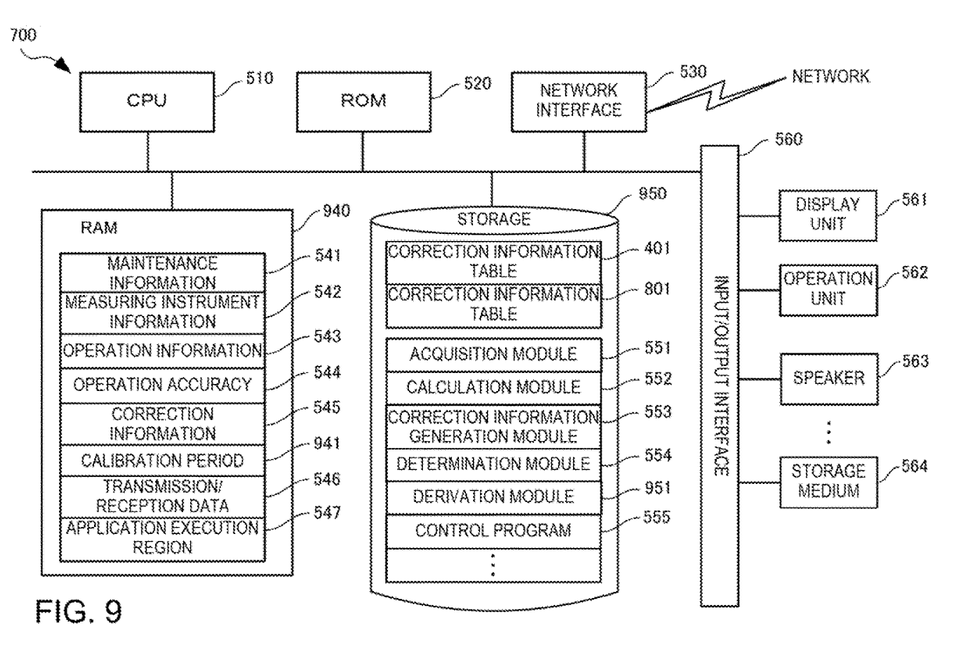
FIG. 9 is a block diagram for explaining the hardware configuration of the information processing apparatus according to the third example embodiment of the present invention.

FIG. 9 is a block diagram for explaining the hardware configuration of the information processing apparatus according to this example embodiment. A RAM 940 is a random access memory used by a CPU 510 as a work area for temporary storage. In the RAM 940, an area for storing data necessary for implementing this example embodiment is allocated. A calibration period 941 is data representing a period to perform calibration of the machine tool 210.

A storage 950 stores databases and various kinds of parameters, or the following data and programs necessary for implementing this example embodiment. The storage 950 stores the correction information table 801. The correction information table 801 is the table shown in FIG. 8, which stores the maintenance information 811 in association with the correction information 414 and the like.

The storage 950 also stores a derivation module 951. The derivation module 951 is a module configured to analyze maintenance information and derive the calibration period of the machine tool. The derivation module 951 is read out to an application execution region 547 of the RAM 940 and executed by the CPU 510.

Figure 10:
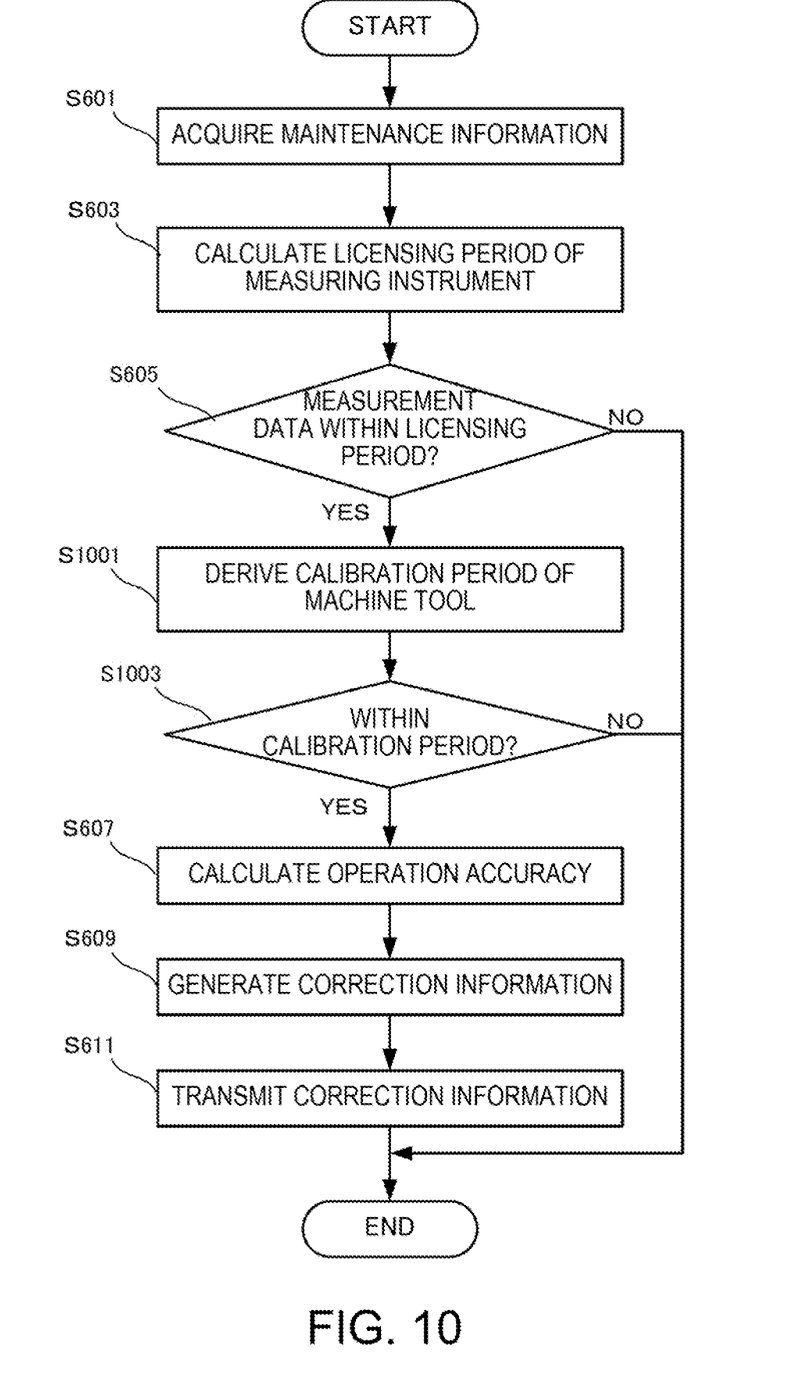
FIG. 10 is a flowchart for explaining the processing procedure of the information processing apparatus according to the third example embodiment of the present invention.

FIG. 10 is a flowchart for explaining the processing procedure of the information processing apparatus according to this example embodiment. This flowchart is executed by the CPU 510 shown in FIG. 9 using the RAM 940, and the functional components of the information processing apparatus 700 shown in FIG. 7 are implemented. In step S1001, the information processing apparatus 700 analyzes maintenance information acquired by the acquirer 301 and derives the calibration period of the machine tool 210. In step S1003, the information processing apparatus 700 determines whether it is within the calibration period of the machine tool 210. Upon determining that it is not within the calibration period of the machine tool 210 (NO in step S1003), the information processing apparatus 700 ends the processing. Upon determining that it is within the calibration period of the machine tool 210 (YES in step S1003), the information processing apparatus 700 advances to step S607.

According to this example embodiment, if it is within the calibration period of the machine tool, correction information is generated. It is therefore possible to perform the correction operation of the machine tool during the calibration period of the machine tool and effectively use the downtime of the machine tool.

Other Example Embodiments

While the invention has been particularly shown and described with reference to example embodiments thereof, the invention is not limited to these example embodiments.

It will be understood by those of ordinary skill in the art that various changes in form and details may be made therein without departing from the spirit and scope of the present invention as defined by the claims. A system or apparatus including any combination of the individual features included in the respective example embodiments may be incorporated in the scope of the present invention.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

The invention claimed is:

1. An information processing apparatus for remotely correcting movement of a machine tool on the basis of measurement data measured by a measuring instrument attached to the machine tool during a licensing period of the measuring instrument, comprising:
   at least one processor; and
   a memory storing instructions that, when executed by the at least one processor, cause the information processing apparatus to:
   acquire maintenance information including the measurement data and identification information of the machine tool from the machine tool or the measuring instrument;
   analyze the acquired maintenance information to calculate the licensing period of the measuring instrument and to determine if the measurement data is measured within the licensing period;
   calculate an operation accuracy of the machine tool using the acquired maintenance information to obtain a calculation result;
   generate correction information of the machine tool based on the calculation result and transmit the correction information to the machine tool; and
   analyze the maintenance information and determine whether the measurement data is data measured during the licensing period of the measuring instrument,
   wherein if it is determined that the measurement data is not the data measured during the licensing period, the correction information is not generated, and
   wherein if the information processing apparatus determines that the measurement data is the data measured during the licensing period, the correction information is transmitted to the machine tool to correct the operation of the machine tool.

2. The information processing apparatus according to claim 1, wherein said memory stores instructions that, when executed by the at least one processor, also cause the information processing apparatus to:
   further acquire operation information of the machine tool, and
   generate the correction information of the machine tool based on the operation information as well.

3. The information processing apparatus according to claim 2, wherein
   the operation information is a temperature inside the machine tool, and
   generating does not use, for generation of the correction information of the machine tool, the measurement data measured in a state in which the temperature inside the machine tool exceeds a predetermined temperature.

4. The information processing apparatus according to claim 2, wherein
   the operation information is an operation history of the machine tool, and
   generating does not use, for generation of the correction information of the machine tool, the measurement data measured in a state in which a predetermined time has not elapsed yet from an operation of the machine tool.

5. The information processing apparatus of claim 1, wherein the operation accuracy is a positioning accuracy.

6. An information processing apparatus for remotely correcting movement of a machine tool on the basis of measurement data measured by a measuring instrument attached to the machine tool during a licensing period of the measuring instrument, comprising:
   at least one processor; and
   a memory storing instructions that, when executed by the at least one processor, cause the information processing apparatus to:
   acquire maintenance information including the measurement data and identification information of the machine tool from the machine tool or the measuring instrument;
   analyze the acquired maintenance information to calculate the licensing period of the measuring instrument and to determine if the measurement data is measured within the licensing period;
   calculate an operation accuracy of the machine tool using the acquired maintenance information to obtain a calculation result;
   generate correction information of the machine tool based on the calculation result and transmit the correction information to the machine tool; and
   analyze the maintenance information and derive a calibration period of the machine tool,
   wherein if it is not the calibration period, the correction information is not generated, and
   wherein if it is the calibration period, the correction information is transmitted to the machine tool to correct the operation of the machine tool.

7. The information processing apparatus of claim 6, wherein the operation accuracy is a positioning accuracy.

8. An information processing method for remotely correcting movement of a machine tool on the basis of measurement data measured by a measuring instrument attached to the machine tool during a licensing period of the measuring instrument, comprising:
   acquiring maintenance information including the measurement data and identification information of the machine tool from the machine tool or the measuring instrument;
   analyzing the acquired maintenance information to calculate the licensing period of the measuring instrument and to determine if the measurement data is measured within the licensing period;
   calculating an operation accuracy of the machine tool using the acquired maintenance information;
   generating correction information of the machine tool based on a calculation result in the calculating;
   transmitting the correction information to the machine tool;

analyzing the maintenance information and determining whether the measurement data is data measured during the licensing period of the measuring instrument, wherein if it is determined that the measurement data is not the data measured during the licensing period, the correction information is not generated, and wherein if it is determined that the measurement data is the data measured during the licensing period, the correction information is transmitted to the machine tool to correct the operation of the machine tool.

9. The information processing method of claim 8, wherein the operation accuracy is a positioning accuracy.

10. An information processing method for remotely correcting movement of a machine tool on the basis of measurement data measured by a measuring instrument attached to the machine tool during a licensing period of the measuring instrument, comprising:

acquiring maintenance information including the measurement data and identification information of the machine tool from the machine tool or the measuring instrument;

analyzing the acquired maintenance information to calculate the licensing period of the measuring instrument and to determine if the measurement data is measured within the licensing period;

calculating an operation accuracy of the machine tool using the acquired maintenance information;

generating correction information of the machine tool based on a calculation result by said calculator;

transmitting the correction information to the machine tool; and analyzing the maintenance information and deriving a calibration period of the machine tool, wherein if it is not the calibration period, the correction information is not generated, and wherein if it is the calibration period, the correction information is transmitted to the machine tool to correct the operation of the machine tool.

11. The information processing method of claim 10, wherein the operation accuracy is a positioning accuracy.

* * * * *